United States Patent
Rein et al.

(10) Patent No.: US 7,171,936 B2
(45) Date of Patent: Feb. 6, 2007

(54) PISTON HAVING A PATTERNED COATING AND METHOD OF APPLYING SAME

(75) Inventors: Wolfgang Rein, Milford, MI (US); David Roth, West Bloomfield, MI (US); Jonathan Douglas, Russellville, TN (US)

(73) Assignee: Mahle Technology, Inc., Farmington Hills, MI (US)

( * ) Notice: Subject to any disclaimer, the term of this patent is extended or adjusted under 35 U.S.C. 154(b) by 384 days.

(21) Appl. No.: 10/691,954

(22) Filed: Oct. 23, 2003

(65) Prior Publication Data

US 2005/0087166 A1    Apr. 28, 2005

(51) Int. Cl.
*F02F 3/00* (2006.01)
*F02F 3/10* (2006.01)

(52) U.S. Cl. .............................. 123/193.4; 29/888.048
(58) Field of Classification Search ............. 123/193.4, 123/193.6; 92/865.5, 162 R, 170.1, 189, 92/259, 212, 232; 29/888.048
See application file for complete search history.

(56) References Cited

U.S. PATENT DOCUMENTS 3,405,610 A    10/1968   Hill et al. ..................... 92/223
3,620,137 A *  11/1971   Prasse .......................... 92/159
3,935,797 A     2/1976   Niimi et al. ................... 92/223
4,075,934 A *   2/1978   Wacker et al. ................ 92/159
4,831,977 A     5/1989   Presswood ................... 123/193
4,987,865 A *   1/1991   Schenkel ................. 123/193.6
5,195,478 A     3/1993   Kawabata et al. ........ 123/193.4
5,313,919 A     5/1994   Rao et al. ................ 123/193.4
5,884,600 A     3/1999   Wang et al. .............. 123/193.6
6,684,844 B1*   2/2004   Wang et al. .............. 123/193.1

FOREIGN PATENT DOCUMENTS

EP            0 422 856        4/1991

* cited by examiner

*Primary Examiner*—Mahmoud Gimie
(74) *Attorney, Agent, or Firm*—Bliss McGlynn, P.C.

(57) ABSTRACT

The present invention relates to a piston adapted for reciprocal movement within the cylinders of an internal combustion engine. The piston includes a body having a crown formed at the uppermost margins of the body and a skirt, depending from the crown, adapted for relative sliding motion with respect to the cylinder. The piston further includes a coating bonded to the piston skirt so as to be juxtaposed between the skirt and the cylinder. The coating has a plurality of recesses formed thereon so as to define a predetermined pattern of recesses on the surface of the skirt that retains lubricant between the skirt and the cylinder wall. The coating may also direct lubricant along the outer circumference of the piston skirt during reciprocal movement of the piston within a cylinder. A method of applying the coating to the piston skirt is also disclosed.

17 Claims, 6 Drawing Sheets

PISTON HAVING A PATTERNED COATING AND METHOD OF APPLYING SAME

BACKGROUND OF THE INVENTION

1. Field of the Invention

The present invention relates, generally, to pistons for internal combustion engines. More specifically, the present invention relates to a piston having a patterned coating applied to the piston skirt for directional lubrication flow and/or lubrication retention as well as a method for applying the coating to the piston.

2. Description of the Related Art

Internal combustion engines known in the related art may generally include, among other basic components, an engine block having one or more cylinders, cylinder heads associated with the engine block and pistons supported for reciprocal movement in each cylinder. The piston generally includes a body having a crown and a skirt that depends from the crown to define the bottom half of the body of the piston. The bottom half is referred to as a skirt because it "skirts" or surrounds a pin bore formed in the body. The pin bore corresponds to a similar bore in the connecting rod. A pin is placed through the corresponding bores to attach the piston to the connecting rod.

Generally, fuel is combusted within the cylinders to reciprocate the pistons. The piston drives the connecting rod, which drives the crankshaft, causing it to rotate within the engine block. In this way, power may be translated from the crankshaft to drive an automotive vehicle or any number of other devices. Specifically, the combustion pressure within the cylinder drives the piston downward in a substantially linear motion. In addition to the substantially linear motion of the piston, there is some lateral movement due to the gap (i.e. tolerance) between the outer surface of the piston and the interior wall of the cylinder.

The term "top dead center" refers to the location of the piston at its uppermost point of reciprocal travel relative to the cylinder and is a point at which the piston is at a dead stop or zero velocity. Correspondingly, the term "bottom dead center" refers to the location of the piston at its lowermost point of reciprocal travel relative to the cylinder and is also a point at which the piston is at a dead stop or zero velocity. During movement of a piston from top dead center to bottom dead center on the powerstroke, the angle of the connecting rod produces a force component on the side of the piston commonly referred to as, "major thrust side." On the other hand, during return movement of a piston from bottom dead center to top dead center produces a force component on the side of the piston commonly referred to as, "minor thrust side."

As a result of firing pressure acting on the piston within the cylinder, the piston skirt presses against the cylinder wall during the powerstroke and return movement. While lubricant (i.e. oil) generally prevents metal-to-metal contact between the piston skirt and the cylinder wall, factors such a load, temperature and insufficient lubrication may reduce or eliminate the layer of lubricant and cause scuffing on the surface of either the piston skirt or the cylinder or both. Scuffing in this area can ultimately cause the engine to seize or fail.

To reduce the likelihood of scuffing between the piston skirt and cylinder wall, it is well known to provide lubrication between the pistons and cylinder walls. In addition, conventional techniques include coating the piston skirt with a material to assist in lubrication and to avoid metal-to-metal contact between the two components, thereby reducing wear, improving lubrication, and/or thermal properties within the cylinder. The surface of the piston skirt may also be etched or roughed in a random manner to create grooves or depressions, prior to applying the coating, to promote adhesion of the coating material to the surface of the piston skirt. These grooves or depressions also provide areas along the surface of the piston skirt that serve to collect lubrication. Applying a coating in a random manner to reduce scuffing on a piston is generally disclosed in U.S. Pat. No. 3,405,610 issued on Oct. 15, 1968 to H. T. Hill et al.; U.S. Pat. No. 3,935,797 issued on Feb. 6, 1976 to Niimi et al.; U.S. Pat. No. 4,831,977 issued on May 23, 1989 to Presswood; U.S. Pat. No. 5,313,919 issued on May 24, 1994 to Rao et al.; and U.S. Pat. No. 5,884,600 issued on Mar. 23, 1999 to Wang et al.

While coated pistons and/or piston skirts used in connection with internal combustion engines of the type known in the related art alleviate some of the problems associated with insufficient lubrication, high load and temperature during the operation of an internal combustion engine, there remains a need for a coated piston that retains a consistent, uniform layer of lubrication along the outer surface of a piston skirt. In addition, there remains a need for a coated piston that provides a directional lubricant flow pattern to control the distribution of lubricant along the outer surface of the piston/piston skirt.

SUMMARY OF THE INVENTION

The present invention overcomes the disadvantages in the related art in pistons for internal combustion engines and generally fulfills a need in the art for a piston skirt having a lubrication-enhancing coating with a specific, predetermined pattern for directing the flow of lubrication and retaining lubrication along the outer surface of a piston skirt. To this end, the piston adapted for reciprocal movement within a cylinder of an internal combustion engine of the present invention includes a body having a crown formed at the uppermost margins of the body and a skirt, depending from the crown, adapted for relative sliding motion with respect to the cylinder. The piston further includes a coating bonded to the piston skirt so as to be juxtaposed between the skirt and the cylinder. The coating has a plurality of recesses formed thereon so as to define a predetermined pattern of recesses on the surface of the skirt that retain lubricant between the skirt and the cylinder wall.

Accordingly, one advantage of the present invention is that it provides a piston having improved properties for retaining lubrication between the piston skirt and cylinder wall during operation of an internal combustion engine.

Another advantage of the present invention is that the piston has improved properties for directing the flow of lubrication between the piston skirt and cylinder wall during operation of an internal combustion engine.

Another advantage of the present invention is that it provides a lubrication enhancing piston skirt having a coating bonded specifically to the thrust sides of a piston skirt, where lubrication is most necessary.

Yet another advantage of the present invention is that it provides a lubrication enhancing piston skirt having a coating bonded to each thrust side in a predetermined pattern for specific lubrication flow direction and/or retention relative to the movement of a piston within a cylinder.

Still another advantage present invention is that it provides a cost-effective method of applying a lubrication-enhancing coating to a piston skirt by using an improved manufacturing process that eliminates the step of microgrooving the piston prior to applying the coating.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
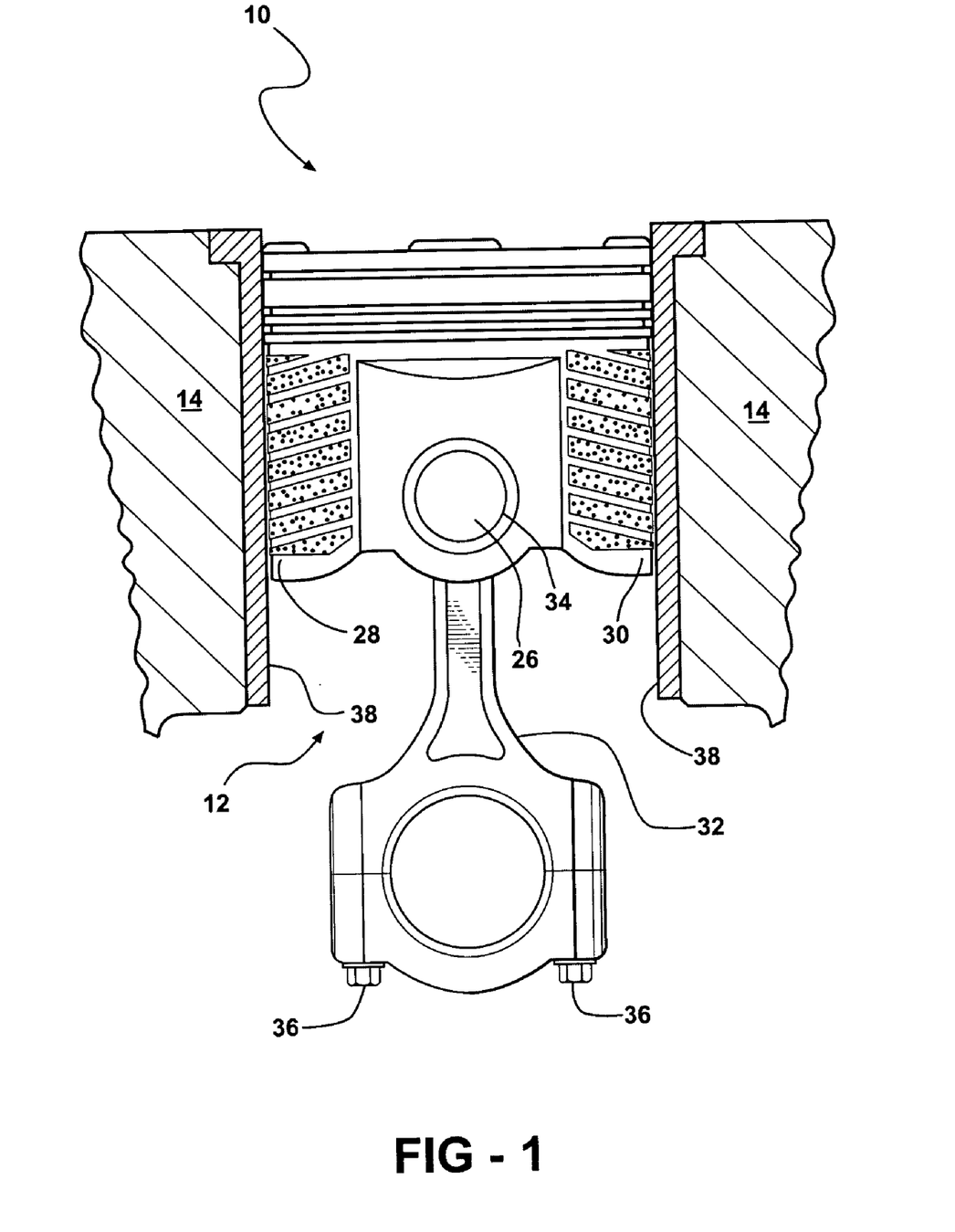
FIG. 1 is a cross-sectional environmental view of a piston having a predetermined pattern coated skirt in accordance with the present invention operatively disposed relative to a cylinder of an internal combustion engine.

The present invention overcomes the disadvantages in the related art in a coated piston, generally indicated at 10, 110, 210, 310, 410, 510, 610 and 710 in the figures, where like numbers are used to designate like structure throughout the drawings. As best shown in FIG. 1, one embodiment of the piston of the present invention is generally indicated at 10.

Figure 2:
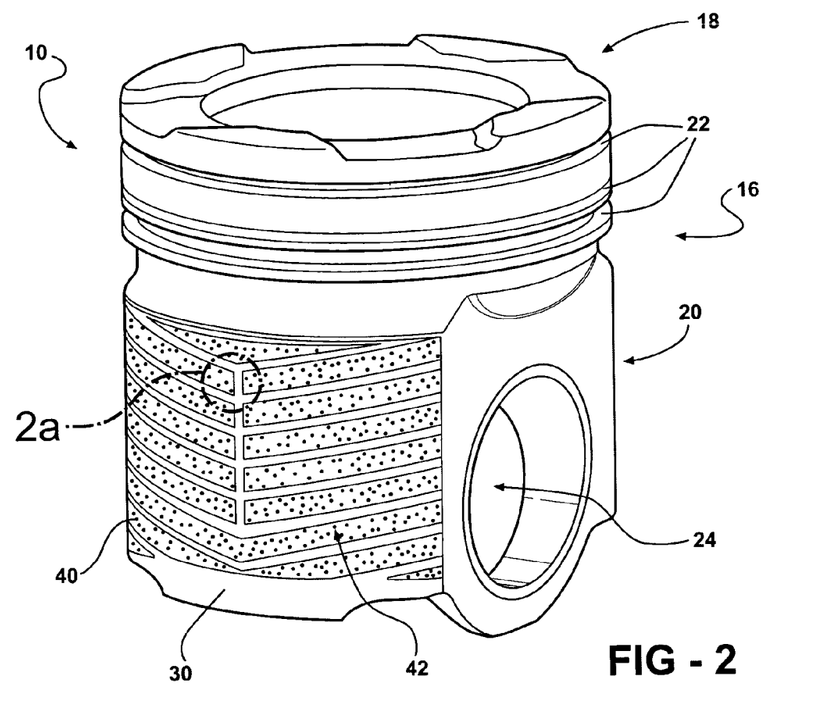
FIG. 2 is a perspective view of a piston having a predetermined patterned coating on the piston skirt that defines a downwardly converging chevron formation and includes a lubrication reservoir channel in accordance with the present invention.

The piston 10 is adapted for reciprocal movement within a cylinder 12 of an internal combustion engine 14. As best shown in FIG. 2, the piston 10 includes a body 16 having a crown 18 formed at the uppermost margins of the body 16 and a skirt 20 depending from the crown 18. The piston 10 further includes ring lands 22 extending about the circumference of the body 16 and adapted to retain piston rings (not shown, but generally known in the art). A pin bore 24 extends through the lower margins of the body 16 and is adapted to receive a piston pin 26.

Figure 3:
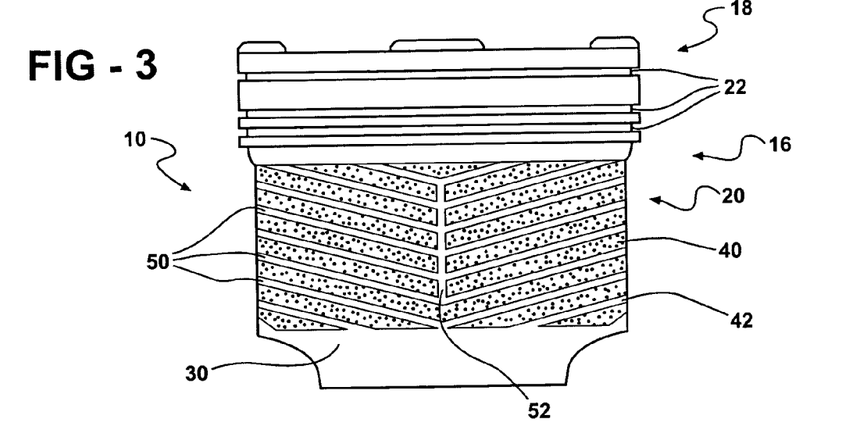
FIG. 3 is a front view of a piston having a predetermined patterned coating on the piston skirt that defines a downwardly converging chevron formation and includes a lubrication reservoir channel in accordance with the present invention

With reference to FIGS. 1–3, the piston skirt 20 includes an outer circumference having a major thrust side 28 and a minor thrust side 30 formed substantially opposite each other on the outer circumference of skirt 20. The piston 10, and more particularly the skirt 20, is adapted for relative sliding motion with respect to a cylinder 12. A connecting rod 32 is adapted to interconnect the piston 10 and a crankshaft (not shown, but generally known in the art). The connecting rod 32 is fastened to the crankshaft using bolts 36. The connecting rod 32 also includes a bore 34 located at one end thereof. A piston pin 26 is operatively received through the aligned pin bore 24 in the piston 10 and the bore 34 extending through the connecting rod 32.

Generally, fuel is combusted within the cylinders 12 to reciprocate the pistons 10. The piston 10 drives the connecting rod 32, which drives the crankshaft, causing it to rotate relative to bearings supported by the engine 14. In this way, power may be translated from the crankshaft to drive an automotive vehicle or any number of other devices. Specifically, the combustion pressure within the cylinder 12 drives the piston 10 downward in a substantially linear motion. In addition to the substantially linear motion of the piston 10, there is some lateral movement due to the gap (i.e. tolerance) between the outer surface of the piston skirt 20 and the interior wall 38 of the cylinder 12.

As a result of lateral movement by the piston 10 within the cylinder 12, the piston skirt 20 presses against the cylinder wall 38 during the powerstroke and return movements. The surface areas of the piston 10 that may contact the cylinder wall 38 during major and minor thrust movements are the major thrust side 28 and the minor thrust side 30. While lubricant (i.e. oil) generally prevents metal-to-metal contact between the piston skirt 20 and the cylinder wall 38, factors such a load, temperature and insufficient lubrication may reduce or eliminate the layer of lubricant and cause scuffing on the surface of either the piston skirt 20 or the cylinder wall 38 or both. Scuffing in this area can ultimately cause the engine 14 to seize or fail.

Accordingly, it is important to keep the major thrust side 28 and the minor thrust side 30 of a piston skirt 20 lubricated. To this end, with reference to FIGS. 1–2a, the piston 10 of the present invention includes a coating 40 bonded to the skirt 20 so as to be juxtaposed between the skirt 20 and the cylinder 12. The coating material may be any material designed to improve lubrication between the piston 10 and a cylinder 12 of a given internal combustion engine 14 suitable for application to a piston skirt 20. By way of example, the coating material may be a polymer or a metallic coating or a combination thereof. Specifically, material such as Grafal®, tungsten, molybdenum, polyphenylene sulphide, polyaryl sulfone, nickel, carbide, or manganese phosphate are suitable coating materials for application to a piston skirt 20. Grafal® is a registered trademark of Mahle GMBH Company. However, those having ordinary skill in the art will appreciate that certain applications or engine types will determine the preferred coating compositions for use within a cylinder 12.

Furthermore, those having ordinary skill in the art will appreciate that certain coating materials require a specific range of thickness in order to perform their intended function within the conditions found in an internal combustion engine 14. As a result, the coating material for use in connection with any given piston 10 will also depend on the tolerance between the piston skirt 20 and the cylinder wall 38. By way of example, the application of a Grafal® coating to a piston skirt 20 may range in a thickness between 5–30 μm, with a preferred range of 10–20 μm, while application of a polymer coating to a piston skirt 20 may have a thickness ranging between 0.010–0.1 mm, with a preferred range of 0.010–0.004 mm. Those having ordinary skill in the art will appreciate that the present invention is intended to encompass a variety of coating materials applied to a variety of piston skirts 20 for use in a variety of cylinders 12 having a variety of tolerances, provided that the coating 40 applied to a piston skirt 20 has a predetermined pattern, as will be explained in greater detail below.

As shown in FIGS. 1–2, the coating 40 includes a plurality of recesses, generally indicated at 42, that define a predetermined pattern on the surface of a piston skirt 20. The recesses 42 may define any number of predetermined patterns, including grooved patterns, for directing lubrication or a series of individual recesses for retaining lubrication as will be explained in greater detail with reference to the embodiments illustrated in the figures. In any event, with reference to FIG. 2a, the coating 40 includes a surface area 44 for engaging the cylinder wall 38 of an internal combustion engine 14 and the recesses 42 include sides 46 for defining pathways for the lubricant (not shown).

Figure 2A:
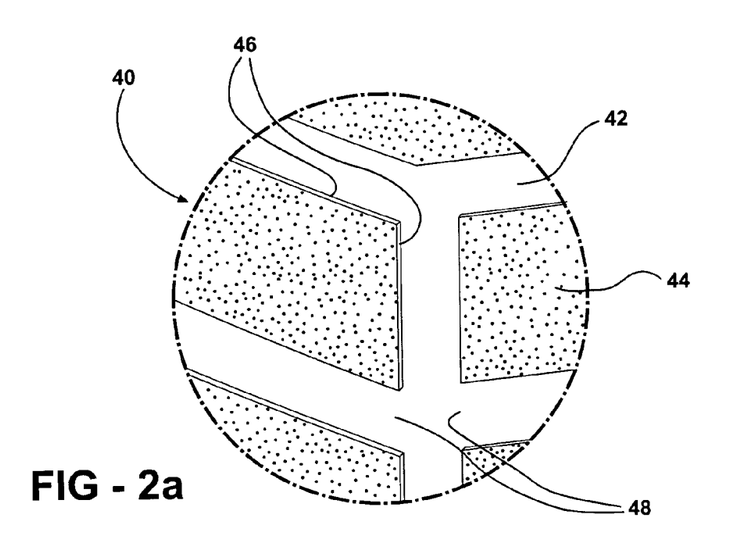
FIG. 2a is a magnified view of a piston skirt having a predetermined patterned coating that defines a downwardly converging chevron formation and includes a lubrication reservoir channel in accordance with the present invention

In the case of a grooved pattern of the type shown in FIG. 2a, the recesses 42 may include open ends 48 that communicate with other grooves to direct lubrication therethrough or closed ends (not shown) that act to retain lubrication with the grooves. Specifically, the predetermined pattern of recesses 42 operatively engage lubricant between the skirt 20 and a cylinder wall 30 to improve lubrication and directional flow of same along the surface of a piston skirt 20. As discussed in greater detail below, the recesses 42 are arranged in a predetermined pattern so as to retain lubrication along the surface of a piston skirt 20 thereby reducing wear between the piston skirt 20 and cylinder wall 30 caused by a lack of lubrication.

Since the major thrust side 28 and minor thrust side 30 of the piston skirt 20 receive the highest contact loads, lubrication in this area is crucial. As will be explained in greater detail below with reference to FIGS. 2–9, the recesses defining a predetermined pattern may direct lubrication toward the center of the major thrust side and/or minor thrust side of a piston skirt. However, those having ordinary skill in the art will appreciate that FIGS. 2–9 merely reflect a representative sample of the virtually infinite number of predetermined patterns that may be applied to a piston skirt to direct and/or retain lubrication and that any predetermined pattern of recesses employed to direct and/or retain lubrication on a piston skirt is intended to be within the scope of the present invention.

Referring now specifically to FIGS. 2–3, in one embodiment of the piston 10 of the present invention the recesses 42 define a predetermined pattern including a series of lubrication flow directing grooves 50 extending in a downwardly converging manner at a predetermined angle across the outer circumference of the piston skirt 20 in a chevron formation. The recesses 42 further define a predetermined pattern that includes a reservoir channel 52 for retaining lubrication along the outer circumference of the piston skirt 20. The reservoir channel 52 extends in a direction substantially parallel to the direction of reciprocal motion of the piston 10 within the cylinder 12. Accordingly, a plurality of the downwardly converging grooves 50 terminate at the reservoir channel 52. Preferably the reservoir channel 52 is located along the latitudinal centerline of the major thrust side 28 or minor thrust side 30 or both thrust sides. However, given the reciprocal movement of the piston 10 within a cylinder 12, the predetermined pattern illustrated in FIGS. 2–3 is preferably applied to that portion of the outer circumference of the piston skirt 20 incorporating the minor thrust side 30, thereby causing the converging grooves 50 to direct the flow of lubrication toward the reservoir channel 52 during minor thrust movement of the piston 10. Nevertheless, those having ordinary skill in the art will appreciate that the predetermined pattern shown in FIGS. 2–3 may be applied to any area of the outer circumference of the piston skirt 20 and that the reservoir channel 52 may be located anywhere on the outer circumference of the piston skirt 20 and need not be latitudinally situated.

Figure 3A:
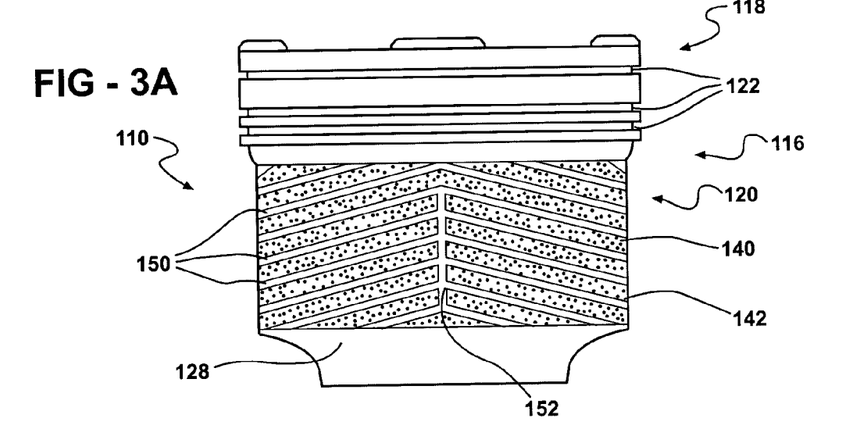
FIG. 3a is a front view of a piston having a predetermined patterned coating on the piston skirt that defines a downwardly diverging chevron formation and includes a lubrication reservoir channel in accordance with the present invention.

An alternative embodiment of the piston of the present invention is generally indicated at 110 in FIG. 3a where like numerals, increased by 100 with respect to the embodiment of the invention illustrated in FIGS. 1–3, are used to designate like structure. The piston 110 of the present invention as shown in FIG. 3a is substantially similar in structure to the piston 10 shown in FIGS. 2–3. However, the series of lubrication flow directing grooves 50 having a chevron formation illustrated in FIG. 3 is shown inverted in FIG. 3a. Specifically in FIG. 3a, the plurality of recesses 142 in the coating 140 define a predetermined pattern that includes a series of lubrication flow directing grooves 150 that downwardly diverge from a reservoir channel 152 at a predetermined angle across the outer circumference of the piston skirt 120 in a chevron formation. Given the reciprocal movement of the piston 110 within a cylinder 12, the embodiment of the present invention illustrated in FIG. 3a is preferably applied to that portion of the outer circumference of the piston skirt 120 incorporating the major thrust side 128 with the reservoir channel 152 located along the latitudinal center line of the major thrust side 128. In this way, the diverging grooves 150 act to direct the flow of lubrication toward the reservoir channel 152 during major thrust movement of the piston 110 in the direction toward bottom dead center. However, those having ordinary skill in the art will appreciate that the predetermined pattern shown in FIG. 3a may be applied to any portion of the outer circumference of the piston skirt 120 and that the reservoir channel 152 may be located anywhere on the outer circumference of the piston skirt 120 and need not be latitudinally situated.

Figure 4:
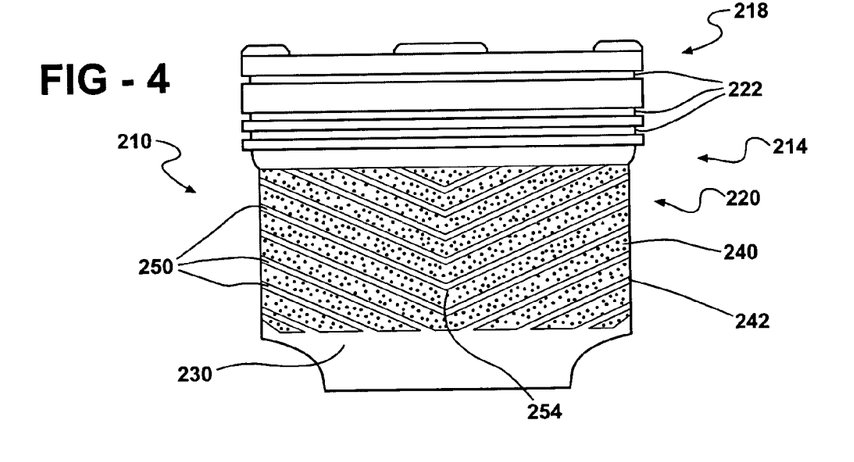
FIG. 4 is a front view of a piston having a predetermined patterned coating on the piston skirt that defines a downwardly converging chevron formation on a piston skirt in accordance with the present invention.

Another alternative embodiment of the piston of the present invention is generally indicated at 210 in FIG. 4 where like numerals, increased by 200 with respect to the embodiments of the invention in FIGS. 1–3, are used to designate like structure. The piston 210 is similar to the piston 10 shown in FIGS. 2–3 and so the description of the structure of the piston will not be repeated here except where expressly mentioned below. The piston 210 shown in FIG. 4 has a coating 240 applied in the skirt 220. The coating 240 has a plurality of recesses 242 that define a predetermined pattern on the skirt 220. The recesses 242 include a series of lubrication flow directing grooves 250 extending in a downwardly converging manner at a predetermined angle across the outer circumference of the piston skirt 220 in a chevron formation. The grooves 250 downwardly converge toward points 254 defined on a common axis extending along the outer circumference of the piston skirt 220. The points of convergence 254 are preferably located along the latitudinal centerline of the major thrust side 228 or minor thrust side 230 or both thrust sides. However, given the reciprocal movement of the piston 210 within a cylinder 12, the predetermined pattern illustrated in FIG. 4 is preferably applied to that portion of the outer circumference of the piston skirt 220 incorporating the minor thrust side 230. In this way, the converging grooves 250 act to direct the flow of lubrication toward the center of the minor thrust side 230 during minor thrust movement of the piston 210 in the direction toward top dead center. Furthermore, those having ordinary skill in the art will appreciate that the predetermined pattern shown in FIG. 4 may be applied to any portion of the outer circumference of the piston skirt 220 and that the points 254 of convergence may be located anywhere on the outer circumference of the piston skirt 220.

Figure 4A:
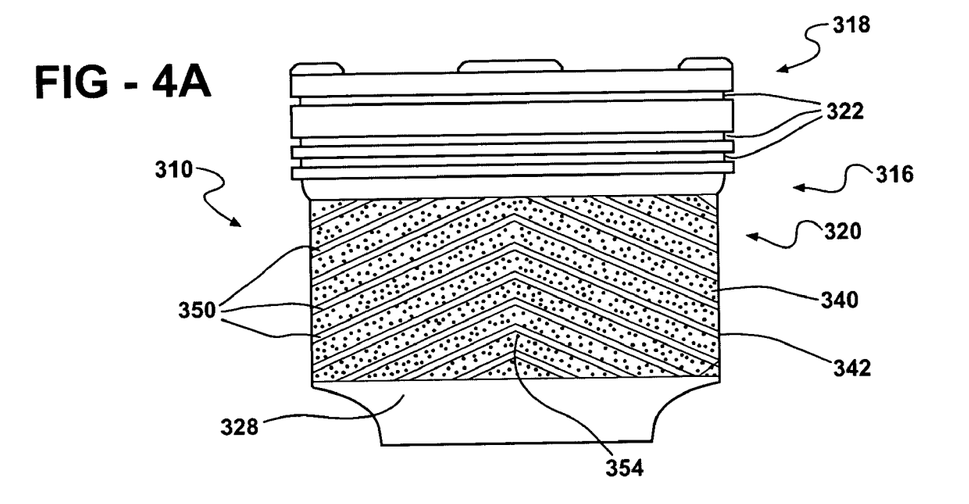
FIG. 4a is a front view of a piston having a predetermined patterned coating on the piston skirt that defines a downwardly diverging chevron formation on a piston skirt in accordance with the present invention.

Yet another alternative embodiment of the piston of the present invention is generally indicated at 310 in FIG. 4a where like numerals, increased by 300 with respect to the embodiments of the invention in FIGS. 1–3, are used to designate like structure. The embodiment of the piston 310 of the present invention as shown in FIG. 4a is substantially similar in structure to the piston 210 shown in FIG. 4. However, the series of lubrication flow directing grooves 250 having a chevron formation illustrated in FIG. 4 is shown inverted in FIG. 4a. Specifically in FIG. 4a, the plurality of recesses 342 formed in the coating 340 applied to the piston skirt 320 define a predetermined pattern wherein the recesses 342 include a series of lubrication flow directing grooves 350 extending in a downwardly diverging manner at a predetermined angle across the outer circumference of the piston skirt 320 in a chevron formation. The grooves 350 downwardly diverge from points 354 defined on a common axis extending along the outer circumference of the piston skirt 320. The points of divergence 354 are preferably located along the latitudinal centerline of the major thrust side 328 or minor thrust side 330 or both thrust sides. However, given the reciprocal movement of the piston 310 within a cylinder 12, the predetermined pattern illustrated in FIG. 4a is preferably applied to that portion of the outer circumference of the piston skirt 320 incorporating the major thrust side 328. In this way, the diverging grooves 350 act to direct the flow of lubrication toward the center of the major thrust side 328 during major thrust movement of the piston 310 in the direction toward bottom dead center. Furthermore, those having ordinary skill in the art will appreciate that the predetermined pattern shown in FIG. 4a may be applied to any portion of the outer circumference of the piston skirt 320 and that the points 354 of divergence may be located anywhere on the outer circumference of the piston skirt 320.

Figure 5:
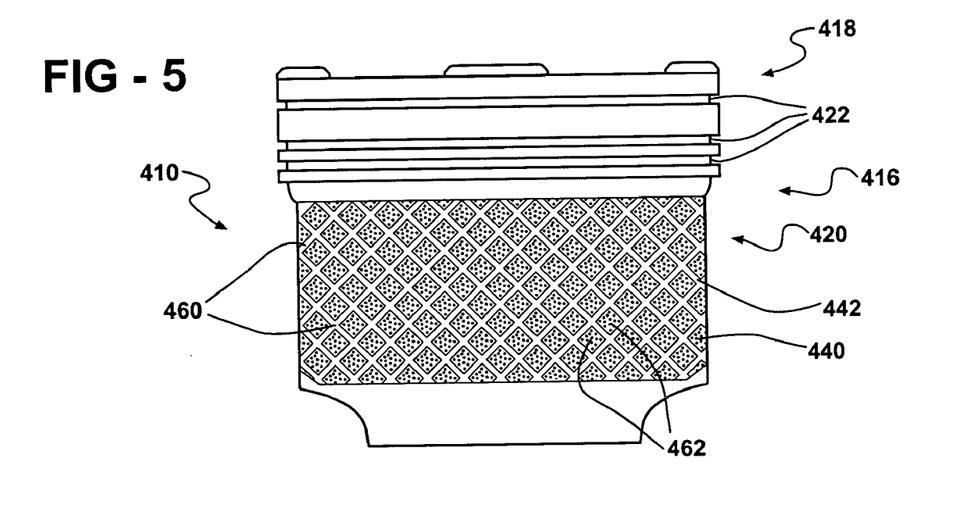
FIG. 5 is a front view of piston having a predetermined patterned coating on the piston skirt that includes a plurality of intersecting grooves defining a hatch-like pattern on a piston skirt in accordance with the present invention.

Still another alternative embodiment of the piston of the present invention is generally indicated at 410 in FIG. 5 where like numerals, increased by 400 with respect to the embodiments of the invention in FIGS. 1–3, are used to designate like structure. The piston 410 is similar to the pistons 10, 110, 210 and 310 shown in FIGS. 2–4a. The piston 410 of the present invention as shown in FIG. 5 includes a coating 440 applied to the skirt 420. The coating 440 includes a plurality of recess 442 defining a predetermined pattern. The recesses 442 define a series of intersecting grooves 460 traversing the outer circumference of the piston skirt 420 in a substantially hatch-like manner. The hatch-like predetermined pattern of recesses 442 provides lubrication retention and/or directs lubrication across the outer circumference of the piston skirt 420 during movement of the piston 410 within a cylinder 12. As illustrated in FIG. 5, the predetermined pattern formed by the recesses 442 define a plurality of coating surface areas 462 for contacting the cylinder wall 38. However, those having ordinary skill in the art will appreciate that the predetermined pattern formed in the coating 440 as illustrated in FIG. 5 may alternatively be accomplished by employing a series of intersecting grooves 460 that traverse the outer circumference of the piston skirt 420 in a substantially circuitous manner.

Figure 6:
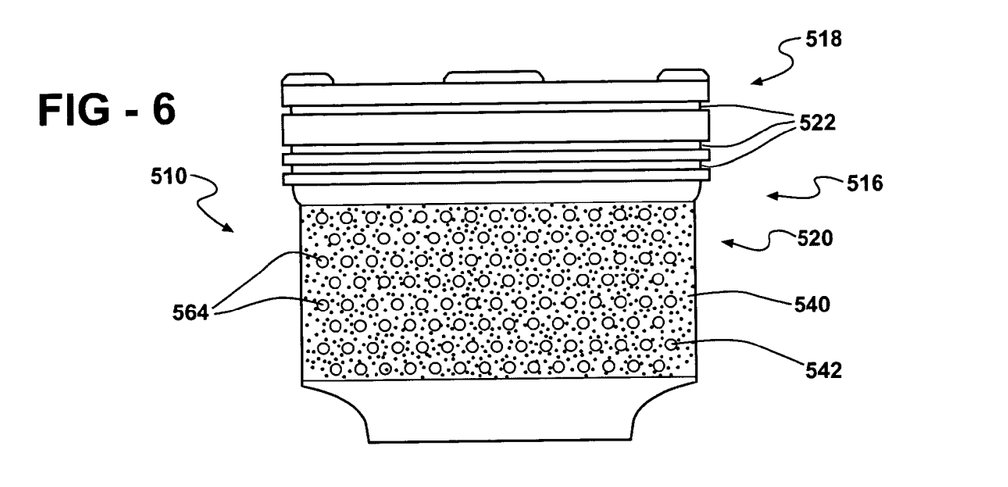
FIG. 6 is a front view of a piston having a predetermined patterned coating on a skirt that defines a plurality of circumferential recesses in accordance with the present invention.

Another alternative embodiment of the piston of the present invention is generally indicated at 510 in FIG. 6 where like numerals, increased by 500 with respect to the embodiments of the invention in FIGS. 1–3, are used to designate like structure. The piston 510 is similar to the pistons 10, 110, 210, 310 and 410 shown in FIGS. 2–5. The piston 510 of the present invention as shown in FIG. 6 includes a coating 540 applied to the piston skirt 520 in covering relation so as to define a plurality of lubrication retaining recesses 542 located in spaced relation with respect to each other. The predetermined pattern of recesses 542 shown in FIG. 6 are a series of substantially uniform disc-like apertures or depressions 564 formed in the coating 540 for retaining lubrication along the outer circumference of the piston skirt 520 during movement of the piston 510 within a cylinder 12. However, those having ordinary skill in the art will appreciate that the recesses 542 shown in FIG. 6 may include apertures or depressions 564 having a variety of shapes and may also include apertures or depressions 564 of differing sizes and depths.

Figure 7:
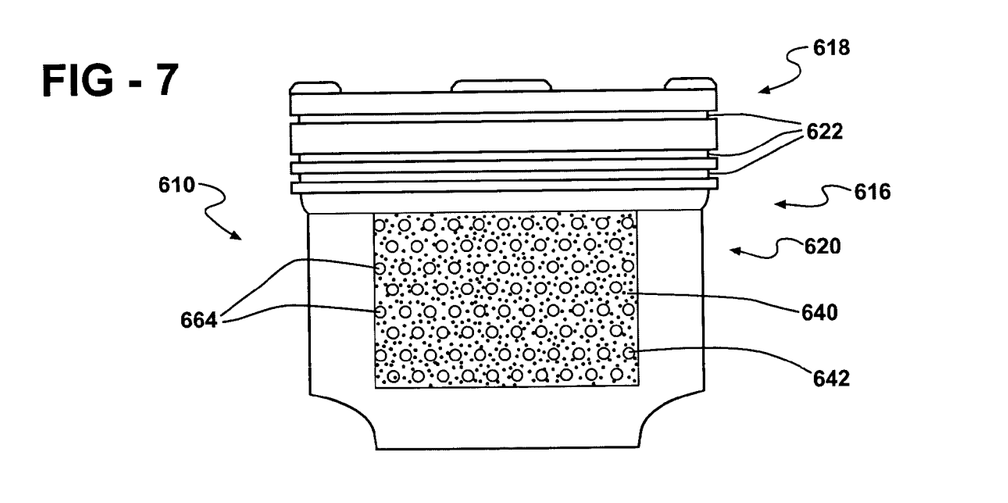
FIG. 7 is a front view of a piston having a predetermined patterned coating that includes a plurality of circumferential recesses localized on a thrust side of the piston skirt in accordance with the present invention.

Another alternative embodiment of the piston of the present invention is generally indicated at 610 in FIG. 7 where like numerals, increased by 600 with respect to the embodiments of the invention shown in FIGS. 1–3, are used to designate like structure. The piston 810 is similar to the pistons 10, 110, 210, 310, 410 and 510 shown in FIGS. 2–6. Similar to FIG. 6, FIG. 7 illustrates a piston 610 including a coating 640 applied to the piston skirt 620. However, the coating 640 of FIG. 7 includes a plurality of lubrication retaining recesses 642 located in spaced relation with respect to each other to define a series of substantially uniform disc-like apertures or depressions 664 formed in the coating 640 in a localized area. In this way, the apertures or depressions 664 act to retain lubrication in a localized manner along the major thrust side 628 or minor thrust side 630 or both of the piston skirt 620. Accordingly, the illustrative embodiment of the present invention shown in FIG. 7 incorporates by reference the alternative embodiments disclosed with respect to FIG. 6. Additionally, those having ordinary skill in the art will appreciate that any of the predetermined patterns of recesses 42, 142, 242, 342, 442 and 542 formed in the coatings 40, 140, 240, 340, 440 and 540 shown in FIGS. 2–6, or any predetermined pattern for directing the flow of lubrication or retaining lubrication or both along the outer circumference of a piston skirt 620, may be applied in a localized manner with respect to the major thrust side 628 or minor thrust side 630 or both thrust sides of a piston skirt 620.

Figure 8:
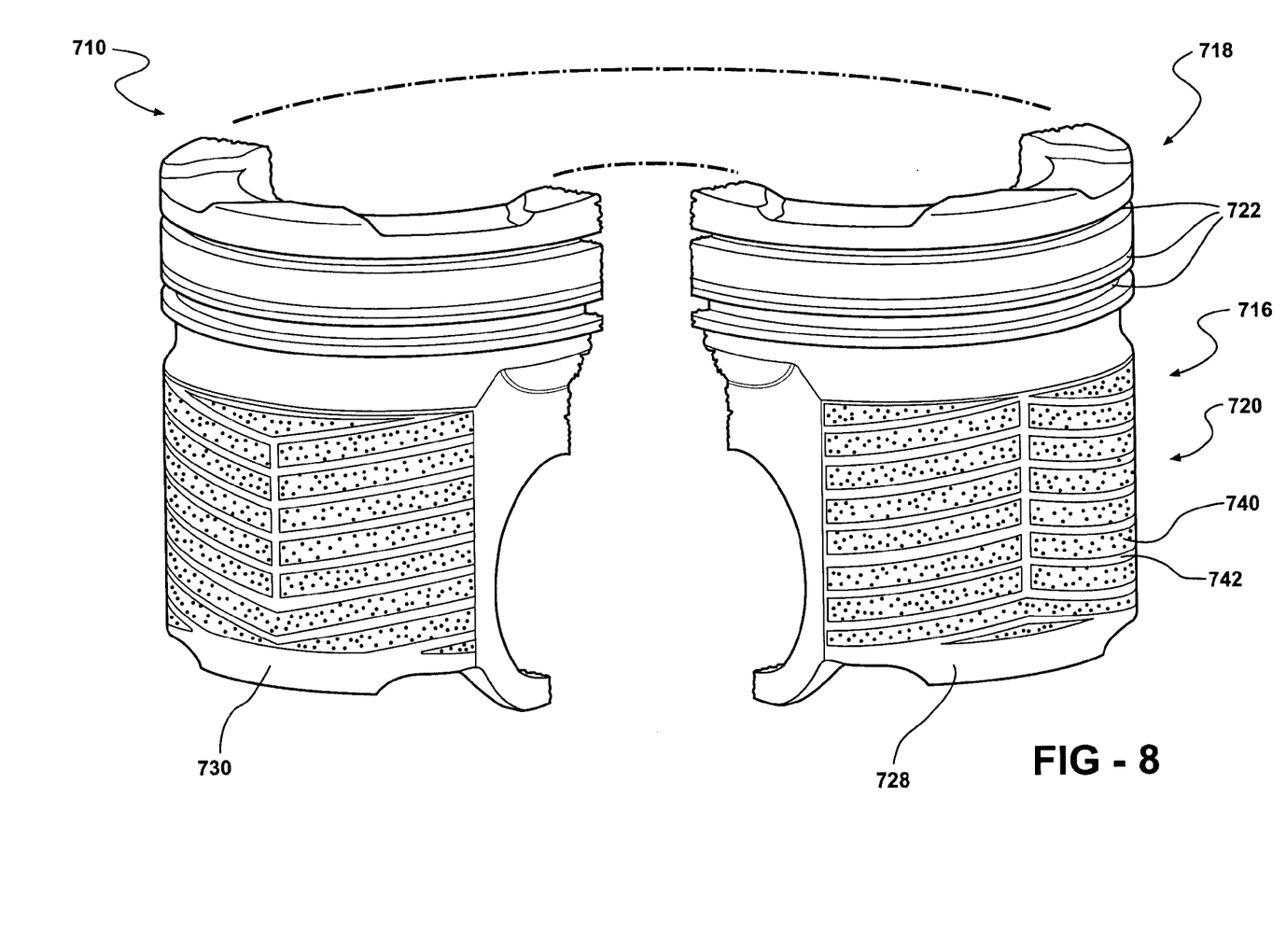
FIG. 8 is a split perspective view of a piston having different predetermined pattern coatings for the portions of the outer circumference of the piston skirt that include the major and minor thrust sides of a piston skirt in accordance with the present invention.

Another alternative embodiment of the piston of the present invention is generally indicated at 710 in FIG. 8 where like numerals, increased by 700 with respect to the embodiments of the invention shown in FIG. 1–3, are used to designate like structure. The piston 710 is similar to the pistons 10, 110, 210, 310, 410, 510 and 610 shown in FIGS. 2–7. As shown in FIG. 8, one predetermined pattern of recesses 742 in the coating 740 may be applied to that portion of the piston skirt 720 including the major thrust side 728 and a different predetermined pattern of recesses 742 in the coating 740 may be applied to that portion of the piston skirt 720 including the minor thrust side 730. Specifically in FIG. 8, the portion of the outer circumference of the piston skirt 720 including the major thrust side 728 bears the predetermined pattern illustrated in FIG. 3a, while the portion of the outer circumference of the piston skirt 720 including the minor thrust side 730 bears the predetermined pattern illustrated in FIGS. 2–3. Those having ordinary skill in the art will appreciate that any two predetermined patterns illustrated in FIGS. 2–8, or any predetermined patterns for directing the flow of lubrication or retaining lubrication or both along the outer circumference of a piston skirt 720, may be applied to opposing sides of the piston skirt 720. Likewise those having ordinary skill in the art will appreciate that any two predetermined patterns illustrated in FIGS. 2–7, or any predetermined patterns for that matter, may be applied in a localized manner with respect to either the major thrust side 728 or the minor thrust side 730 or both.

The coating 40, 140, 240, 340, 440, 540, 640 and 740 having a predetermined pattern of recesses as illustrated in FIGS. 1-9 may be applied to a piston skirt 20, 120, 220, 320, 420, 520, 620, 720 by a silk-screening method. The method will be described with reference to the piston 10 illustrated in FIGS. 1–3. However, from the description that follows, those having ordinary skill in the art will appreciate that the method may be used to apply any coating illustrated here or described in the claims. Using this method, a silkscreen having a predetermined pattern is directed in proximate relation to the outer surface of the piston skirt 20. A coating material is then applied to the outer surface of the piston skirt 20 through the silkscreen to impart a predetermined pattern. Subsequent to application of the predetermined pattern to the piston skirt 20, the coating material will be left to cure and bond to the surface of the piston skirt 20. Those having ordinary skill in the art will appreciate that the curing duration depends on a variety of factors, namely the coating material's composition. Means to accelerate and/or facilitate the curing time may be employed, and these means will depend on the composition of the coating material. Such means may include the use of heat lamps, ovens, directing warmed air over the coated piston skirt 20, and/or using a curing agent or catalyst.

Furthermore, since the predetermined pattern may be specific to each thrust side 28 and 30 of a single piston skirt 20. The application of a predetermined pattern may also include locating a particular thrust side 28 or 30 of a piston skirt 20 and directing the silkscreen having a predetermined pattern specific to a particular thrust side 28 or 30 of a piston skirt 20 in proximate relation to the corresponding thrust side 28 or 30 of the piston skirt 20. The coating material is then applied to the corresponding thrust side 28 or 30 of the piston skirt 20 through the silkscreen to impart a predetermined pattern. The opposing thrust side 28 or 30 of a piston skirt 20 is then located and a silkscreen having a predetermined pattern for the opposing thrust side 28 or 30 of a piston skirt 20 is directed in proximate relation to the opposing thrust side 28 or 30. The coating material is applied to the opposing thrust side 28 or 30 through the silkscreen to impart a predetermined pattern of recesses thereon. Subsequent to applying a coating having a predetermined pattern of recesses to the thrust sides 28 and 30, the coating material is left to cure and bond to the surface of a the piston skirt 20. As stated above, other steps may be employed to accelerate and/or facilitate curing. These steps may also be employed with respect to this method of applying a predetermined pattern particular to each thrust side 28 and 30 of a piston skirt 20.

The present invention imparts a coating having a predetermined pattern of recesses along the outer circumference of a piston skirt. Accordingly, the present invention improves lubrication retention and lubrication flow along the outer circumference of a piston skirt between the piston skirt and cylinder wall 38 during operation of an internal combustion engine 14. Further, the present invention employs a coating having a predetermined pattern that is bonded to portions of the outer circumference of a piston skirt including a particular thrust side. This predetermined pattern provides a piston skirt having enhanced lubrication and/or retention properties particular to each thrust side of piston skirt. Further, the present invention imparts a predetermined pattern specifically designed for localized application onto a particular thrust side of a piston skirt. This structure improves the directional flow and/or retention of lubrication along the thrust side of a piston skirt where lubrication is most necessary during reciprocal movement of the piston within a cylinder 12. Further, the present invention employs a coating 40, 140, 240, 340, 440, 540, 640 and 740 having a predetermined pattern of recesses 42, 142, 242, 342, 442, 542, 642, 742 for improving lubrication retention and/or flow direction onto a piston skirt without the need to micro-groove or otherwise specially treat the surface of a piston skirt prior to applying the predetermined pattern. The present invention also provides a cost-effective method of applying a lubrication-enhancing coating material to a piston skirt by reducing the steps of the manufacturing process.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A piston adapted for reciprocal movement within a cylinder of an internal combustion engine, said piston comprising:

a body defining a longitudinal axis of said piston extending in the direction of reciprocal movement and having a crown formed at the uppermost margins of said body and a skirt depending from said crown and adapted for relative sliding motion with respect to the cylinder, said skirt including an outer circumference having a major thrust side and a minor thrust side formed substantially opposite each other on said outer circumference of said skirt;

a coating bonded to said skirt so as to be juxtaposed between said skirt and the cylinder, said coating having a plurality of recesses formed thereon so as to define a predetermined pattern of recesses on the surface of said skirt, said plurality of recesses including a series of lubrication grooves extending across said outer circumference of said piston skirt at a predetermined angle relative to said longitudinal axis such that said series of grooves collectively define a chevron formation that act to operatively engage lubricant between said skirt and the cylinder wall.

2. A piston as set forth in claim 1, wherein said plurality of recesses include a series of lubrication flow directing grooves extending in a downwardly converging manner at a predetermined angle relative to said longitudinal axis and across said outer circumference of said piston skirt in a chevron formation.

3. A piston as set forth in claim 2, wherein said plurality of recesses further include a reservoir channel located substantially at the center of said minor thrust side of said piston skirt and extending in a direction substantially parallel to the direction of reciprocal motion of said piston within the cylinder, said chevron formation of grooves terminating at said reservoir channel.

4. A piston as set forth in claim 1, wherein said plurality of recesses include a series of flaw directing lubrication grooves extending in a downwardly diverging manner at a predetermined angle relative to said longitudinal axis and across said outer circumference of said piston skirt in a chevron formation.

5. A piston as set forth in claim 4, wherein said plurality of recesses further include a reservoir channel located substantially at the center of said major thrust side of said piston skirt and extending in a direction substantially parallel to the direction of reciprocal motion of said piston within the cylinder, said chevron formation of grooves terminating at said reservoir channel.

6. A piston as set forth in claim 1, wherein said plurality of recesses include a series of lubrication flow directing grooves extending in a downwardly converging manner at a predetermined angle relative to said longitudinal axis and across said minor thrust side in a chevron formation.

7. A piston as set forth in claim 6, wherein said plurality of recesses further include a reservoir channel located substantially at the center of said minor thrust side and extending in a direction substantially parallel to the direction of reciprocal motion of said piston within the cylinder, said chevron formation of grooves terminating at said reservoir channel.

8. A piston as set forth in claim 1, wherein said plurality of recesses include a series of lubrication flow directing grooves extending in a downwardly diverging manner at a predetermined angle relative to said longitudinal axis and across said major thrust side in a chevron formation.

9. A piston as set forth in claim 8, wherein said plurality of recesses further include a reservoir channel located substantially at the center of said major thrust side and extending in a direction substantially parallel to the direction of reciprocal motion of said piston within the cylinder, said chevron formation of grooves terminating at said reservoir channel.

10. A piston as set forth in claim 1, wherein said coating is a polymer coating.

11. A piston as set forth in claim 1, wherein said coating is a metallic coating.

12. A piston adapted for reciprocal movement within a cylinder of an internal combustion engine, said piston comprising:
a body defining a longitudinal axis of said piston extending in the direction of reciprocal movement and having a crown formed at the uppermost margins of said body and a skirt depending from said crown and adapted for relative sliding motion with respect to the cylinder, said skirt including an outer circumference having a major thrust side and a minor thrust side formed substantially opposite each other on said outer circumference of said skirt;
a coating bonded to said skirt so as to be juxtaposed between said skirt and the cylinder, said coating having a plurality of recesses formed thereon so as to define a predetermined pattern of recesses on the surface of said skirt, said plurality of recesses including a series of intersecting grooves extending across the outer circumference of said piston skirt at a predetermined angle relative to said longitudinal axis so as to define a substantially hatch-like pattern, operatively engaging lubricant between said skirt and the cylinder wall.

13. A piston as set forth in claim 12, wherein said coating is bonded to said major thrust side and said minor thrust side of said piston skirt and adapted to operatively engage lubricant between said major thrust side and the cylinder wall and said minor thrust side and the cylinder wall.

14. A piston as set forth in claim 12, wherein said coating is a polymer coating.

15. A piston as set forth in claim 12, wherein said coating is a metallic coating.

16. A piston adapted for reciprocal movement within a cylinder of an internal combustion engine, said piston comprising:
a body having a crown formed at the uppermost margins of said body and a skirt depending from said crown and adapted for relative sliding motion with respect to the cylinder, said skirt including a substantially smooth outer circumference having a major thrust side and a minor thrust side formed substantially opposite each other on said outer circumference of said skirt;
a coating bonded to said skirt so as to be juxtaposed between said skirt and the cylinder, said coating having a plurality of recesses formed thereon so as to define a predetermined pattern of recesses on the surface of said skirt, said plurality of recesses defining a series of lubrication retaining discs in uniform spaced relation with respect to each other to provide lubrication retention along said outer circumference of said piston skirt.

17. A piston as set forth in claim 16, wherein said coating is bonded to said major thrust side and said minor thrust sides of said piston skirt relation and adapted to operatively engage lubricant between said major thrust side and the cylinder wall and said minor thrust side and the cylinder wall.

* * * * *